Feb. 5, 1935.    F. GRAY    1,990,183
ELECTROOPTICAL SYSTEM
Filed June 25, 1931
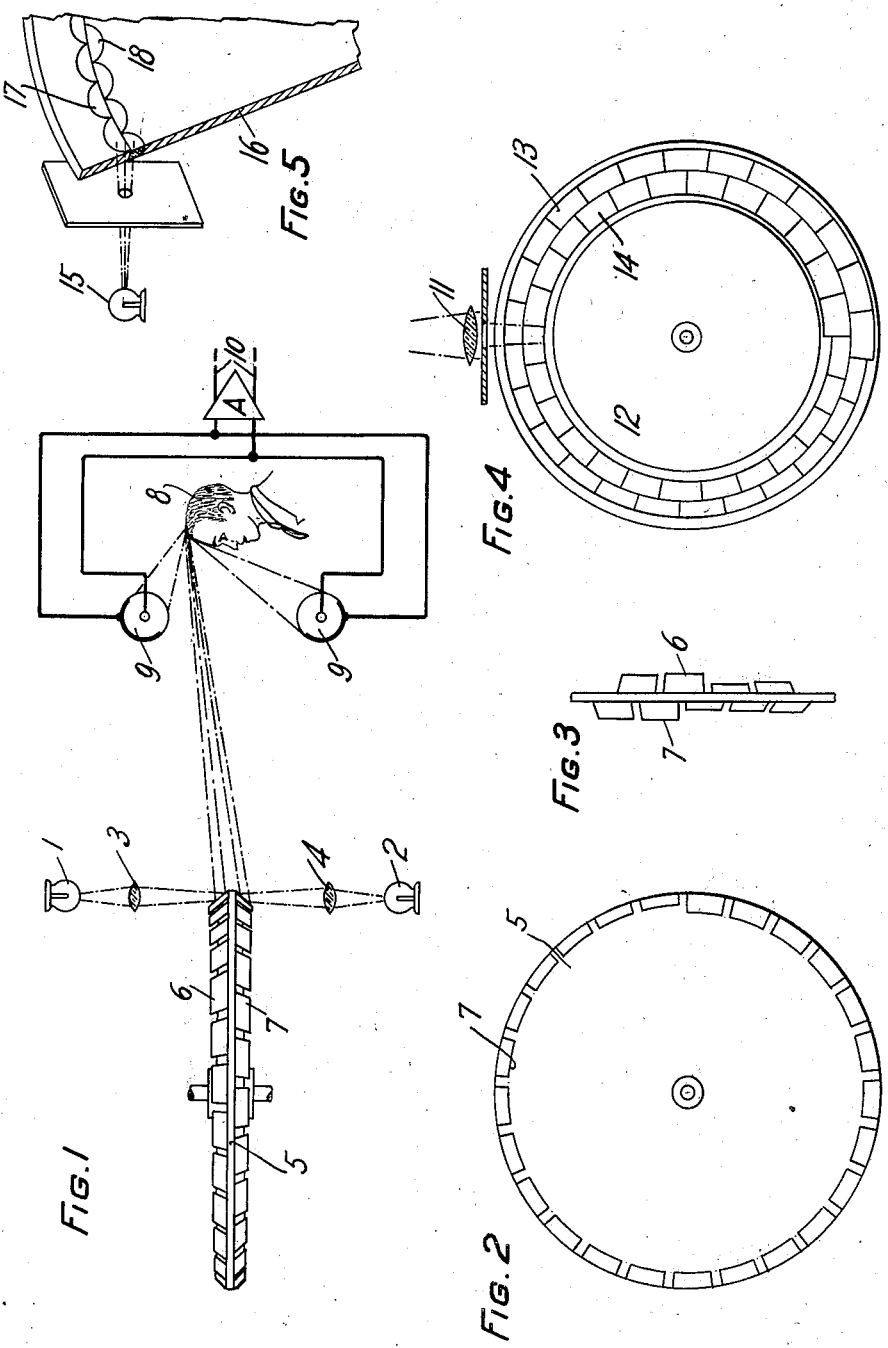

Patented Feb. 5, 1935

1,990,183

UNITED STATES PATENT OFFICE 1,990,183

ELECTROOPTICAL SYSTEM

Frank Gray, New York, N. Y., assignor to Bell Telephone Laboratories, Incorporated, New York, N. Y., a corporation of New York Application June 25, 1931, Serial No. 546,739

12 Claims. (Cl. 178—6)

This invention relates to electro-optical systems and more particularly to apparatus for producing a beam of light for spot illumination.

It is now well recognized that the method of illuminating a subject or object to be scanned for the transmission of a television image which comprises illuminating the object by means of a traveling beam of light has marked advantages over so-called flood lighting.

The usual apparatus for producing the moving beam of light is a rotating disc provided with a spiral of apertures through which parallel or substantially parallel rays obtained from an arc lamp are projected and moved across a large lens which results in the rays being given a high velocity of movement across the object compared with the velocity of the apertures. Light from the object then impinges directly upon large stationary photoelectric cells or large optical collecting surfaces which focus the light upon small photoelectric cells.

Such a system has the disadvantage that the light from the arc is not very efficiently utilized. At most only a small amount of light can pass through each of the small apertures in the scanning disc. It has already been proposed to substitute large lenses for the small apertures of the scanning disc and illuminate this lensed disc directly from a point source of light. Such an arrangement is much more efficient than that employing a disc with small apertures. A lensed disc however has the disadvantages that good lenses are expensive and the weight of the disc is such as to introduce large centrifugal forces. Plane mirrors on the other hand are relatively inexpensive and of smaller mass.

One of the objects of the present invention is to provide a rotating mirror arrangement for spot illumination of a field of view which will have an optical efficiency of the order of that of lensed discs.

It has heretofore been suggested to use a rotating element provided with plane mirrors set at different angles and to move these mirrors in turn through a converging beam of light produced with a point light source and a stationary converging lens. The beam may be either focussed upon the mirrors or at the field of view. If the beam is focussed upon the mirrors the reflected beam of light will be rapidly divergent, if the incident beam diverges rapidly, as is necessary if an intense beam is to be obtained from the point source of light, but, since the spot of light on the field must be small, the divergence of the beam cannot be great. This arrangement is therefore optically inefficient.

The other arrangement in which the original focus of the beam is at the field of view necessitates the intercepting of the beam by the reflecting surfaces at a point where the beam has considerable cross-sectional area. Since the entire field of view is swept over by the reflected beam while the reflecting surface is moving through a very small angle, the time taken by the reflecting surface to completely enter the beam and then to completely leave the beam is a considerable portion of the time taken to sweep a beam across a field, that is, a line scanning period, since the reflecting element must be at least large enough to receive the entire light from the beam. As a matter of fact it is advantageous to have the reflecting elements contiguous at the edges. The period during which a reflecting surface is entering or leaving the beam might under these conditions be, for example, a fourth of the line scanning period. The same situation would be present in a lensed disc arrangement if the lenses were contiguous at the edges and the stationary light beam were made narrow enough so that only two lenses, for example, were simultaneously illuminated. During the time that the mirror or lens is entering the beam and again during the time that it is leaving the beam the light could obviously not be utilized for scanning. This would result in a very material loss of line or transmission time.

Another object of the present invention is to provide a system for producing spot illumination of a field of view utilizing mirrors or lenses with a concentrated beam of incident light in such a manner as to avoid the above mentioned waste of transmission time.

In an embodiment of the invention herein chosen for illustration and later described in detail light from a point source is associated with a converging lens or lens system to produce a narrow converging concentrated beam of light into the path of which is successively moved reflecting surfaces circularly arranged upon a rotatable disc and having progressively different angles of inclination to the disc. All of these angles of inclination are of the order of 45°. The resulting reflected beams come to a focus at the field of view and sweep thereacross in parallel horizontal lines. The light reflected from the objects within the field is received upon large photoelectric cells to set up the image currents. To avoid the above mentioned loss of transmission time a similar set of reflecting surfaces is placed on the opposite side of the disc in staggered relation with those of the first series and the angles of inclination of the surfaces of the first series and the number of these surfaces are so chosen that the first series will scan alternate strips of the entire field. The reflecting surfaces of the second series scan the intermediate lines, there being a second source of light similar to the first cooperating with the second series of reflecting elements. Since the two stationary beams are aligned and the cross-sectional area of each beam is such as to illuminate at least half of a reflecting surface when the surface is entirely within the path of the beam, a pair of staggered reflecting surfaces is simultaneously fully illuminated at each instant. While one of these surfaces is sweeping its reflected beam across the field the other surface is entering or leaving its incident beam. The field is of such size that as one beam completes its sweep the other is of normal intensity and ready to begin its sweep.

The optical efficiency of such a system as this can easily be made of the order of a thousand times that of the usual arrangement employing an apertured disc. This is obvious when it is appreciated that in the usual arrangement the light passing through a single aperture at each instant is 1/2500 of the total light of the illuminating beam in the case where fifty apertures are employed, while in the system just described the light of the entire beam from each source is utilized one half the time.

A more detailed description of the invention follows and is illustrated in the attached drawing.

Fig. 1 illustrates a television transmitting apparatus involving the invention;

Fig. 2 is a face view of the scanning disc of Fig. 1;

Fig. 3 is an edge view of a portion of the scanning disc;

Fig. 4 is a face view of a scanning disc having two sets of mirrors co-operating with a single light source; and Fig. 5 illustrates a portion of a scanning disc provided with two sets of lenses.

The television transmitter of Fig. 1 comprises two sources of light 1 and 2, lenses 3 and 4, a rotating disc 5 having on one face a row of mirrors 6, and on the other face a row of mirrors 7, a field or subject 8 to be scanned for transmission and a pair of light sensitive devices 9 shown, by way of example, as photo-electric cells.

Light from the source 1 is concentrated by the lens 3 into a beam which is supplied to the mirrors 6. The light beam is reflected by the mirrors to effect spot illumination of the subject or field to be transmitted.

The mirrors 6 are angularly offset with respect to each other, so that the beam of light supplied by the successive mirrors illuminates or scans a different unit band or line of the subject 8.

In a similar manner light supplied by the source 2 is reflected by the mirrors 7 which are offset with respect to each other, so that the light beam supplied by the successive mirrors illuminates or scans a different unit band or line of the subject 8.

The unit bands or lines scanned by the light beams supplied by the mirrors 6 alternate with those illuminated by the beams from the mirrors 7.

Thus during one revolution of the disc 5 the subject will be completely scanned in two alternate sets of bands or lines. For example, mirrors 6 will produce a series of light beams which scan lines 1, 3, 5, etc., and mirrors 7 will provide light beams which scan lines 2, 4, 6, etc.

Light reflected from elemental areas of the subject 8, is applied to the photo-electric cells 9. The photo-electric currents, after being amplified by the amplifier A, are supplied to a transmission circuit 10, which may be a line extending to a remote station or the input circuit of a line carrier or radio transmitter.

As shown, the mirrors 6 are offset with respect to mirrors 7. The result is that as the light beam, reflected by any mirror 6 of one row, leaves the right hand edge of the subject 8, a mirror 7 of the other row is supplying a beam of light of normal intensity to left hand edge of the field 8.

The advantage of the mode of operation described in the preceding paragraph will be apparent from the following considerations.

Assume, for example, that but one light source 1 and one row of mirrors 6 are provided, that the mirrors are so set with respect to each other that they supply light beams respectively illuminating successive unit bands of the subject 8 without a break in the continuity of the illumination, and that the subject 8 is completely scanned during one rotation of the disc 5.

If the light beam, into which the mirrors are introduced and from which they are withdrawn, were infinitely small, that is, without dimensions; it would be possible to introduce and withdraw the mirrors without causing variations in the intensity of the light supplied to the subject 8. However, since the beam supplied by the source 1 has finite dimensions, the intensity of the light supplied to the subject will vary during definite intervals of time for each mirror.

As the mirror enters the beam, the intensity of the light applied to the subject will increase from a low value, as the advancing edge of the mirror begins to enter the beam, to a normal value when the mirror is completely within the beam. Conversely, as the mirror leaves the beam, the intensity of the light applied to the subject will vary from a normal value to a low value as the trailing edge of the mirror passes out of the beam. Since this occurs for each mirror, the tone values of elemental areas along the two edges of the image produced at the receiving station will differ, from the corresponding elemental areas of the subject scanned at the transmitter, by amounts determined by the position of the mirror with respect to the beam.

The above noted condition may be avoided, by so adjusting the mirrors with respect to the beam from the source that a scanning beam is only applied to the subject during the time when the light supplied by the mirrors is of normal intensity. This is objectionable for the reason that if the width of the field is not reduced the time required to transmit a subject of given dimensions is increased by twice the mirror transition periods, i. e., at the beginning and end of each scanning line.

Again, if the width of the field is reduced, to eliminate the distorted edges, no photo-electric currents are produced during the intervals corresponding to the width of the deleted edges and hence during these intervals the transmission circuit is idle.

In either case there are definite intervals of time when the line is not used and hence the line-time operating efficiency of the system is reduced.

Fig. 4 illustrates an alternative scanning mechanism which may be used in the system hereinbefore described. This mechanism comprises a rotary disc 12 carrying two rows of mirrors 13 and 14 which co-operate with a beam of light supplied through the lens 11.

As in the previously described scanning unit, the mirrors of each series 13 and 14, respectively, are offset with respect to each other and are supplied with light from the source through lens 11 to produce two beams of light which alternately illuminate successive unit bands or lines of the field or area to be transmitted. Again, the series of mirrors 13 are staggered with respect to the series 14 so that they co-operate to maintain continuity in the illumination supplied to the elemental areas of the field being scanned by a beam and the illumination is always of normal intensity.

The principles of this invention may be applied to a scanning mechanism including condensing lenses. As shown in Fig. 5, light from the source 15 is supplied through the lensed disc 16 to illuminate the subject to be transmitted which in this case may be a continuously moving picture film. The disc 16 is provided with two series of half lenses 17 and 18 which are staggered with respect to each other. These half lenses are arranged on each side of the circle, that is, on a line parallel to the periphery of the disc.

As in the mirror system of Fig. 4, the lenses supply light beams which scan alternate unit bands of the subject and each lens is completely within the path of the light from the source 15, before the scanning beam is applied to the area to be scanned. Again, because of the staggered effect, the two rows of lenses co-operate to supply an illuminating beam of normal light intensity to the subject at every instant of a scanning period. It will be obvious that this staggered arrangement permits the use of half lenses having a diameter twice that of the lens which would be employed for the same resolution if these lenses were contiguous.

The system herein described operates to produce photo-electric currents which are truly proportional to the elemental areas of the subject scanned at the transmitter and to continuously supply photo-electric currents to the transmission circuit.

Consequently the image currents supplied to the transmission circuit corresponds to the actual tone values of the field scanned, and the line-time efficiency of the system is not reduced.

What is claimed is:

1. Means for scanning a field of view in parallel elemental strips comprising means for setting up stationary light rays, two similar rows of light directing elements, the distance between centers of adjacent elements of each row being of the order of the dimension of each element along a line joining their centers, means for moving said elements in paths intersecting said rays, one series intersecting one portion of said rays while the other intersects a different portion thereof, and means for maintaining the different elements of each of said rows during their movement in position for causing the elements of each row to move their emerging beams in succession across respective elemental strips of said field in alternation with corresponding elements of the other of said rows.

2. Means for scanning a field of view in parallel elemental strips comprising means for setting up stationary light rays, two similar rows of light directing elements, the distance between centers of adjacent elements of each row being of the order of the dimension of each element along a line joining their centers, means for moving said elements in paths intersecting said rays, one series intersecting one portion of said rays while the other intersects a different portion thereof, and means for maintaining the different elements of each of said rows during their movement in position for causing the elements of each row to move their emerging beams in succession across respective elemental strips of said field in alternation with corresponding elements of the other of said rows, the dimension of the path of said stationary light rays in the direction of movement of said elements being such at a reflecting surface that the incident light extends a considerable portion at least of the width of the elements, but does not simultaneously cover two adjacent elements.

3. Means for scanning a field of view in parallel elemental strips comprising means for setting up stationary light rays, two similar rows of light directing elements, the distance between centers of adjacent elements of each row being of the order of the dimension of each element along a line joining their centers, means for moving said elements in paths intersecting said rays, one series intersecting one portion of said rays while the other intersects a different portion thereof, and means for maintaining the different elements of each of said rows during their movement in position for causing the elements of each row to move their emerging beams in succession across respective elemental strips of said field in alternation with corresponding elements of the other of said rows with a velocity greater at said field than the velocity of said light directing elements.

4. Means for scanning a field of view of parallel elemental strips comprising means for setting up stationary light rays, two similar series of circularly arranged reflecting elements, the distance between centers of adjacent elements of each series being of the order of the dimension of each element along the line joining their centers, means for moving said elements in paths intersecting said rays, one series intersecting one portion of said rays while the other intersects a different portion thereof, and means for maintaining the different elements of each of said series during their movement in position for causing the elements of each series to move their emerging beams in succession across respective elemental strips of said field in alternation with corresponding elements of the other of said series.

5. Means for scanning a field of view of parallel elemental strips comprising means for setting up stationary light rays, two similar series of circularly arranged reflecting elements, the distance between centers of adjacent elements of each series being of the order of the dimension of each element along the line joining their centers, means for moving said elements in paths intersecting said rays, one series intersecting one portion of said rays while the other intersects a different portion thereof, and means for maintaining the different elements of each of said series during their movement in position for causing the elements of each series to move their emerging beams in succession across respective elemental strips of said field in alternation with corresponding elements of the other of said series, the dimension of the path of said stationary light rays in the direction of movement of said elements being such at a reflecting surface that the incident light extends a considerable portion at least of the width of the elements, but does not simultaneously cover two adjacent elements.

6. Means for scanning a field of view in parallel elemental strips comprising means for setting up convergent light rays, two similar rows of light directing elements, the distance between centers of adjacent elements of each row being of the order of the dimension of each element along a line joining their centers, means for moving said elements in paths intersecting said rays, one series intersecting one portion of said rays while the other intersects a different portion thereof, and means for maintaining the different elements of each of said rows during their movement in position for causing the elements of each row to move their emerging beams in succession across respective elemental strips of said field in alternation with corresponding elements of the other of said rows.

7. Means for scanning a field of view in parallel elemental strips comprising means for setting up stationary light rays, two similar series of converging lenses, the distance between centers of adjacent lenses in each series being of the order of the dimension of each lens along the line joining their centers, means for moving said lenses in paths intersecting said rays, one series intersecting one portion of said rays while the other intersects a different portion thereof, and means for maintaining the different lenses of each of said series during their movement in position for causing the lenses of each series to move their emerging beams across said field in alternation with corresponding lenses of the other of said series.

8. Means for scanning a field of view in parallel elemental strips comprising means for setting up stationary non-contiguous light beams, two similar series of light directing elements, the distance between centers of adjacent elements in each series being of the order of the dimension of each element along a line joining their centers, means for moving said elements in paths intersecting said rays, one series intersecting one of said beams while the other intersects the other of said beams, and means for maintaining the different elements of each of said rows during their movement in position for causing the elements of each row to move their emerging beams in succession across respective elemental strips of said field in alternation with corresponding elements of the other of said rows.

9. Means for scanning a field of view in parallel elemental strips comprising means for setting up stationary light rays, two similar series of light directing elements, the distance between centers of adjacent elements in each series being of the order of the dimension of each element along a line joining their centers and the elements of one series being staggered with respect to those of the other, and means for moving said elements in paths intersecting said rays to cause elements of each series alternately to move their emerging beams in succession across respective strips of said field.

10. Means for scanning a field of view in parallel elemental strips comprising means for setting up light rays, two similar rows of light directing elements, the distance between centers of adjacent elements of each row being of the order of the dimension of each element along a line joining their centers, means for moving said elements in paths intersecting said rays, one series intersecting one portion of said rays while the other intersects a different portion thereof, and means for maintaining the different elements of each of said rows during their movement in position for causing the elements of each row to move their emerging beams in succession across respective elemental strips of said field in alternation with corresponding elements of the other of said rows.

11. Means for scanning a field of view in parallel elemental strips comprising means for producing two light beams, two light directing elements, means for producing uniform relative motion between one beam and one element in a direction transverse of said beam and simultaneously the same relative motion between the other of said beams and the other of said elements to cause said elements and their beams to intercept each other and thereby form emerging beams which respectively scan different strips of elemental width of said field so that as the area of interception of one element becomes a maximum that on the other element begins to decrease, the dimensions in said directions both of said beams and of said elements being so great that the distance covered by each scanning beam in the region of said field during the completing of each said interception is many times said elemental strip width.

12. Means for scanning a field of view in parallel elemental strips comprising means for producing two stationary light beams, pairs of light directing elements, means for cyclically moving said elements of each of said pairs in paths transverse respectively to the axes of said beams to cause said elements and their respective beams to intercept each other and form beams which emerge from said elements and respectively scan different strips of elemental width of said field, the elements of each of said pairs being in such position relative to each other and their respective beams that as the area of interception on one element becomes a maximum that on the other element begins to decrease, the dimensions of said beams and of said elements in a direction transverse to said beams being so great that the distance covered by each scanning beam in the region of the field during the completing of each interception is many times said elemental strip width.

FRANK GRAY.